United States Patent
Meyer

(10) Patent No.: US 11,543,063 B2
(45) Date of Patent: Jan. 3, 2023

(54) BREAKAWAY COUPLING WITH AN ANTI-ROTATION SAFEGUARD

(71) Applicant: ELAFLEX HIBY GMBH & CO. KG, Hamburg (DE)

(72) Inventor: Ulrich Meyer, Hamburg (DE)

(73) Assignee: ELAFLEX HIBY GMBH & CO. KG, Hamburg (DE)

( * ) Notice: Subject to any disclaimer, the term of this patent is extended or adjusted under 35 U.S.C. 154(b) by 0 days.

(21) Appl. No.: 17/608,520

(22) PCT Filed: May 4, 2020

(86) PCT No.: PCT/EP2020/062276
§ 371 (c)(1),
(2) Date: Nov. 3, 2021

(87) PCT Pub. No.: WO2020/225192
PCT Pub. Date: Nov. 12, 2020

(65) Prior Publication Data
US 2022/0146030 A1  May 12, 2022

(30) Foreign Application Priority Data

May 3, 2019 (EP) ..................................... 19172437

(51) Int. Cl.
*F16L 37/30* (2006.01)
*F16L 37/084* (2006.01)
(Continued)

(52) U.S. Cl.
CPC .............. *F16L 37/30* (2013.01); *F16L 37/084* (2013.01); *F16L 37/40* (2013.01); *F16L 55/1015* (2013.01)

(58) Field of Classification Search
CPC ......... F16L 37/30; F16L 37/084; F16L 37/40; F16L 55/1015
See application file for complete search history.

(56) References Cited

U.S. PATENT DOCUMENTS 3,719,194 A    3/1973  Anderson et al.
4,674,525 A *  6/1987  Richards ............. F16L 55/1007
                                                    137/614.04
(Continued)

FOREIGN PATENT DOCUMENTS

CN    103732968    4/2014
CN    104285090    1/2015
(Continued)

OTHER PUBLICATIONS

International Preliminary Report on Patentability, International Application No. PCT/EP2020/062276, dated Jul. 21, 2021, 12 pages.

*Primary Examiner* — Patrick C Williams
(74) *Attorney, Agent, or Firm* — Casimir Jones, S.C.; Brian F. Bradley

(57) ABSTRACT

A breakaway coupling for connecting two fluid lines, comprising a first coupling part (3) which can be connected to the first fluid line and a second coupling part (4) which can be connected to the second fluid line. The coupling parts (3, 4) can be disconnected from one another by way of a defined disconnecting force, wherein at least one of the coupling parts (3, 4) has an outflow prevention valve (20) with a valve seat (21) and with a sealing body (14) which is configured for interaction with the valve seat (21). The outflow prevention valve (20) has a hold-open element (16) which is configured to enable a passage of the fluid in the joined-together state of the coupling parts (3, 4). The outflow prevention valve (20) is configured to prevent an outflow of the fluid from at least one of the fluid lines in the disconnected state of the coupling parts (3, 4). The breakaway coupling has an anti-rotation safeguard which, during operation of the coupling, prevents a rotation of the first coupling part (3) and the second coupling part (4) with respect to one another. According to the invention, the valve seat (21) has a bearing surface (24) for the sealing body (14), wherein a (Continued)

Figure 1:
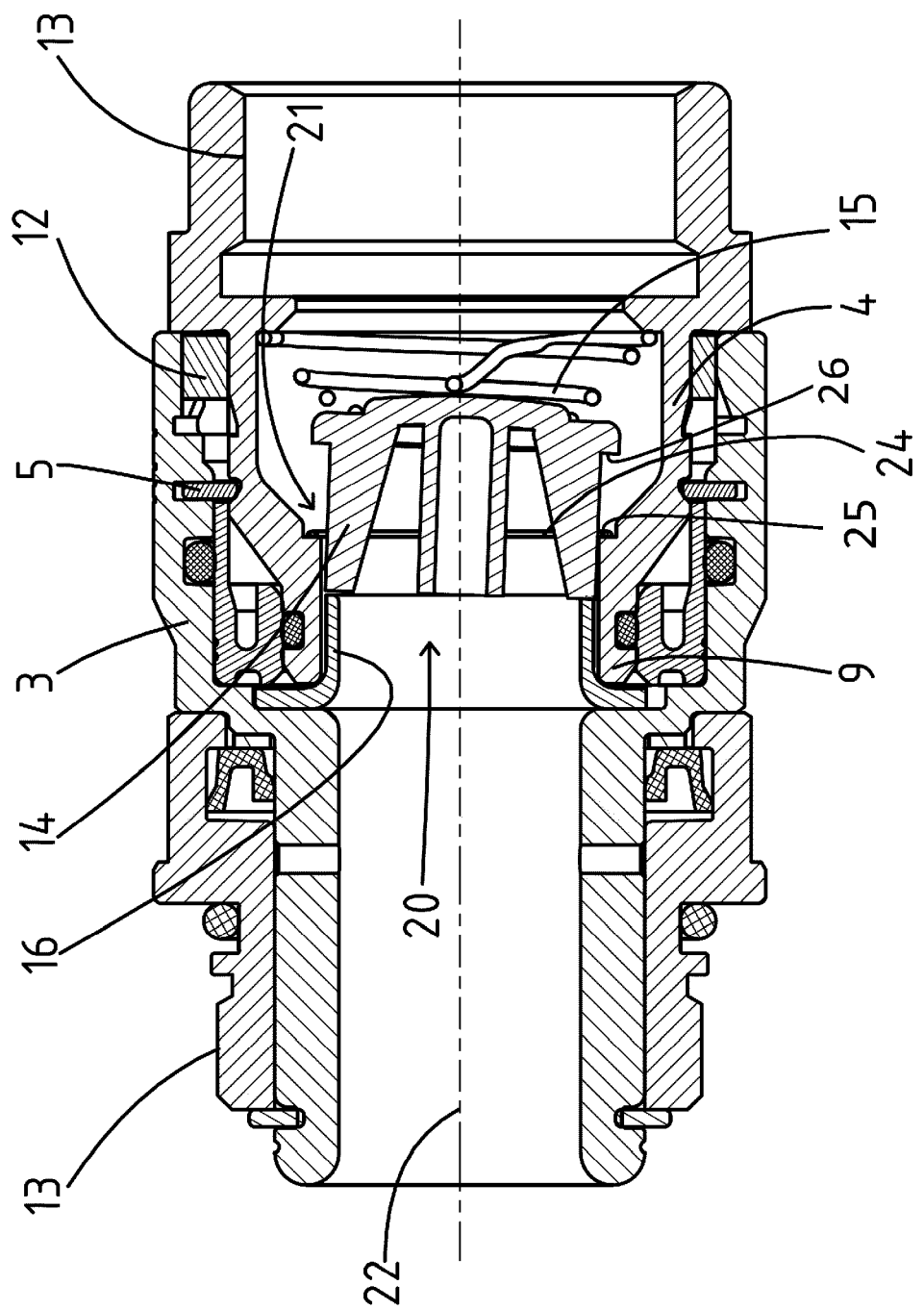

compensatory element (25) is arranged in the region of the bearing surface (24), which compensatory element (25) consists of a material which has a lower hardness than the material of the valve seat (21) and/or than the material of the sealing body (14).

22 Claims, 3 Drawing Sheets

(51) Int. Cl.
    *F16L 55/10*     (2006.01)
    *F16L 37/40*     (2006.01)

(56) References Cited

U.S. PATENT DOCUMENTS

| | | | |
|---|---|---|---|
| 4,763,683 A * | 8/1988 | Carmack | F16L 37/32 |
| | | | 141/285 |
| 5,018,546 A | 3/1991 | Carmack et al. | |
| 5,228,474 A | 7/1993 | Nimberger | |
| 5,360,413 A * | 11/1994 | Leason | A61M 39/26 |
| | | | 604/249 |
| 5,578,059 A * | 11/1996 | Patzer | A61M 39/045 |
| | | | 604/249 |
| 6,997,181 B2 * | 2/2006 | Fletcher | B63C 11/02 |
| | | | 137/614.04 |
| 8,141,849 B1 * | 3/2012 | Blume | F16K 1/38 |
| | | | 137/516.29 |
| 10,047,886 B2 | 8/2018 | Meyer | |
| 2013/0099486 A1 | 4/2013 | Weh et al. | |
| 2014/0097610 A1 | 4/2014 | Meyer | |
| 2015/0167882 A1 | 6/2015 | Von Keitz | |
| 2015/0277611 A1 | 10/2015 | Sugiyama et al. | |
| 2017/0138517 A1 | 5/2017 | Arnold | |

FOREIGN PATENT DOCUMENTS

| | | |
|---|---|---|
| CN | 106907541 | 6/2017 |
| DE | 10 2005 011601 | 9/2006 |
| DE | 20 2010 009871 | 8/2011 |
| EP | 3 457 016 | 3/2019 |
| WO | 95/25242 | 9/1995 |
| WO | 2012/003927 | 1/2012 |
| WO | 2012/163910 | 12/2012 |
| WO | 2014/097610 | 6/2014 |

\* cited by examiner

BREAKAWAY COUPLING WITH AN ANTI-ROTATION SAFEGUARD

The present invention relates to a breakaway coupling for connecting fluid lines. The breakaway coupling comprises a first coupling portion which can be connected to a fluid line and a second coupling portion which can be connected to a second fluid line. The coupling portions can be separated from each other by means of a defined separation force. At least one of the coupling portions has an outflow prevention valve having a valve seat and a sealing member which is constructed to cooperate with the valve seat. The outflow prevention valve comprises a hold-open element which is constructed in the assembled state of the coupling portions to enable fluid to flow through. The outflow prevention valve is additionally constructed in the separated state of the coupling portions to prevent an outflow of the fluid from at least one of the fluid lines. The breakaway coupling further has an anti-rotation safeguard which during operation of the coupling prevents the first coupling portion and the second coupling portion from being rotated relative to each other.

Such breakaway couplings serve to connect two fluid lines to each other and at the same time to enable a controlled and defined separation of the fluid lines from each other in the event of significant forces acting on one or both fluid lines. The breakaway coupling thereby prevents damage to the fluid lines and a resultant undesirable discharge of the fluid. Breakaway couplings are used, for example, to connect a discharge hose to a discharge valve in order to dispense a fuel.

During operation of a breakaway coupling, torques are regularly transmitted to the coupling portions by means of the fluid lines which are connected to the breakaway coupling and may lead to rotation of the first coupling portion relative to the second coupling portion. The relative rotation may be linked with friction wear in the region of the structural elements of the coupling portions responsible for the separable connection, which friction wear in the long term may lead to an impairment of the functionality of the breakaway coupling. In WO 2012/163910 A1 it has therefore been proposed to provide an anti-rotation safeguard which prevents rotation of the two coupling portions with respect to each other and which thus significantly increases the long-term durability. However, it has been found that during long-term operation with an anti-rotation safeguard negative influences on the outflow prevention valve may occur.

Against this background, an object of the present invention is to provide a breakaway coupling whose reliability is further increased. This object is achieved with the features of the independent claims. Advantageous embodiments are set out in the dependent claims. According to the invention, the valve seat has an abutment face for the sealing member, wherein in the region of the abutment face there is arranged a compensation element which comprises a material which has a lower hardness than the material of the valve seat and/or than the material of the sealing member. According to the invention, there is additionally provision for the outflow prevention valve to have a guide which has play for the sealing member and which is constructed in the closure position to allow an angular deviation of at least 0.1° between an axial direction of the valve seat and an axial direction of the sealing member. In an alternative embodiment which may have independent inventive content the construction of the above-described guide which has play is not required.

Firstly, some of the terms used in the context of the invention will be explained.

An outflow prevention valve is arranged on at least one of the coupling portions in order to prevent an outflow of the fluid from the respective fluid line which is connected to this coupling portion.

In order to prevent an outflow of the fluid, the outflow prevention valve comprises a valve seat and a sealing member. The outflow prevention valve in the assembled state of the coupling portions is retained by the hold-open element in an open position in which the sealing member is generally held in the open position by the hold-open element counter to a closure force. In the event of separation of the coupling portions, the hold-open element is generally released from the sealing member so that it is moved by the closure force into the closure position in which it is tensioned against the valve seat. The outflow prevention valve has a guide for the sealing member which has "play". This means that the axial direction of the sealing member relative to the axial direction of the valve seat is not precisely determined, but instead is variable within specific limits. The axial directions of the sealing member or valve seat can be determined by the symmetry properties of these elements. In particular, the guide which has play in the closure position of the outflow prevention valve enables an angular deviation between the mentioned axial directions of at least 0.1°. Preferably, the guide in the closure position enables an angular deviation between the axial directions of at least 0.2°, more preferably of at least 0.5°. In addition, it is preferable for the guide in the closure position to enable an angular deviation between the axial directions of less than 5°. Such a guide is structurally significantly simpler to produce than a guide with play which precisely determines the orientation of the valve seat and sealing member. In addition, a guide with play has positive effects on the separation properties of the breakaway coupling.

In the context of the invention, it has been recognized that the prevention of the relative rotation of the coupling portions in a breakaway coupling of the type mentioned in the introduction may, on the one hand, lead to the above-mentioned advantage of reduced wear, but, on the other hand, at least after a relatively long period of use, may also involve the disadvantage that negative influences may occur on the outflow prevention valve, for example, incorrect positions of the sealing member of the outflow prevention valve relative to the valve seat. This disadvantage is connected to the hold-open element of the breakaway coupling. The hold-open element serves to hold the outflow prevention valve open in the connected state of the coupling portions, for example, by pressing on the sealing member and thus holding it in the open position counter to a closure force of the outflow prevention valve. If the breakaway coupling has no anti-rotation safeguard, the regular rotation of the coupling portions relative to each other leads to the hold-open element transmitting this rotation at least partially to the sealing member so that it is moved relative to the sealing seat. This movement was previously given no consideration in the prior art.

Although the documents US 2019 0086014 A1 or U.S. Pat. No. 5,018,546 disclosed breakaway couplings with anti-rotation prevention means in which a sealing element is arranged in the region of the abutment face of the valve seat, the breakaway couplings have in this prior art outflow prevention valves with a guide with play for the sealing member. This means that the problem of misalignments of the sealing members relative to the valve seat in this prior art cannot occur at all since the play-free guide prevents such misalignments.

Only in the context of the invention has it been recognized that, in outflow prevention valves with a guide which has play for the sealing member, the relative movement which is transmitted from the hold-open element to the sealing member is important in order to ensure correct orientation of the sealing member relative to the sealing seat even over long periods of use. If this relative movement is prevented by the anti-rotation safeguard, small misalignments of the sealing member may therefore occur over time. This disadvantage of an anti-rotation safeguard was not, however, readily evident since it may only become apparent after a long period of use after which, for example, as a result of impacts or other environmental influences, a misalignment could slowly occur without being compensated for again by a regular rotation of the coupling portions.

Against this background, in the context of the present invention it has been recognized that, in a breakaway coupling with anti-rotation safeguard in order to compensate for the slight misalignments, it is sufficient in the region of the abutment face between the sealing member and valve seat of the outflow prevention valve to arrange a compensation element which comprises a material which has a lower hardness than the material of the valve seat or than the material of the sealing member. The softer material of the compensation element enables the sealing member, in spite of a possible slight misalignment relative to the longitudinal axis of the outflow prevention valve which has built up over time, in the event of a separation of the coupling portions, to move into sealing abutment with the valve seat by the compensation element permitting a local more powerful deformation and thus compensating for the misalignment. In the prior art, the provision of such a compensation element was previously completely unconventional since the production process becomes more complex and cost-intensive as a result of the introduction of the additional material of lower hardness.

Preferably, the compensation element is arranged between the valve seat and the sealing member in such a manner that the compensation element prevents, in the region of the abutment face, direct contact between the valve seat and the sealing member. The positive effect of this embodiment is based on the recognition that remaining contact in the region of the abutment face between the material of the sealing member and the material of the valve seat in the event of a misalignment of the sealing member may lead to a leakage which is not overcome by the compensation element. If such contact is prevented, however, full use can be made of the compensation effect of the compensation element.

In a preferred embodiment, the material of the compensation element has a lower hardness than the material of the valve seat and than the material of the sealing member. In this instance, both the sealing member and the valve seat in the event of a misalignment of the sealing member may bring about a deformation of the compensation element, by means of which the misalignment is compensated for.

In a preferred embodiment, the compensation element is secured in a frictionally engaging and/or positive-locking manner on the valve seat or on the sealing member. It may in particular be introduced in a positive-locking manner into the valve seat or also be placed in a frictionally engaging and/or positive-locking manner around the sealing member. To this end, the sealing member or the valve seat may have a groove which extends in a peripheral direction and in which the compensation element is inserted, wherein the sealing member or the valve seat are preferably constructed in a resilient manner so that a clamping action is applied to the compensation element which is inserted into the groove. Alternatively, the compensation element may be connected to the valve seat or to the sealing member in a materially engaging manner. For example, there may be provision for the compensation element to be injected or adhesively bonded onto the material of the valve seat or the sealing member. Alternatively, there may also be provision for the valve seat or the sealing member to be produced with a compensation element which is connected in a materially engaging manner with a two-component injection-molding method.

The material of the compensation element preferably has a hardness which is in the range between 25 and 100 Shore-A, preferably in the range between 70 and 95 Shore-A and in a further preferred manner in the range between 75 and 90 Shore-A, in each case preferably determined in accordance with DIN ISO 7619-1. The valve seat and/or the sealing member may be produced from a metal material, plastics material or also from other materials and has a higher level of hardness than the compensation element. For example, the valve seat and/or the sealing member may have or be formed from one of the materials set out below: an aluminum alloy, preferably with a hardness between 50 HB and 160 HB (Brinell hardness preferably established in accordance with DIN EN 754-2/755-2, hardenable/non-hardenable), a hardenable steel, preferably with a hardness between 40 HRC and 64 HRC (Rockwell hardness, preferably established in accordance with DIN EN 10083), a high-grade steel, preferably with a hardness between 200 HB and 250 HB (Brinell hardness preferably established in accordance with DIN EN 10088), a non-alloyed steel, preferably with a hardness between 100 HB and 120 HB (Brinell hardness preferably established in accordance with DIN EN 10025), a plastics material, preferably with a hardness between 46 Shore-D and 100 Shore-D (preferably established in accordance with DIN ISO 7619-1), and/or a ceramic material, preferably with a hardness between 900 HV10 and 2500 HV10 (Vickers hardness). It has been found that, as a result of the above-mentioned hardness ranges, a particularly good compensation of misalignments is enabled, wherein at the same time erosion and wear of the sealing seat, sealing member and compensation element are kept small.

In a preferred embodiment, the compensation element has a plastics material and in particular an elastomer material or is formed therefrom. In a further preferred manner, the sealing member and/or the valve seat has a metal, a plastics material or a ceramic material or is formed therefrom. This material selection has been found to be advantageous in order to be able to effectively compensate for misalignments of the sealing member and at the same time to ensure long-term reliable operation of the breakaway coupling.

As a result of the compensation element according to the invention, it is possible to configure the material of the sealing member and/or the valve seat in the region of the abutment face with a greater mean roughness depth than was conventional in the prior art. The production of the sealing member or valve seat is thereby simplified. In a preferred embodiment, the sealing member and/or the valve seat in the region of the abutment face has/have a mean roughness depth R, in accordance with DIN EN ISO 4287:1984 which is between 1 µm and 63 µm, preferably between 4 µm and 25 µm, in a further preferred manner between 4 µm and 10 µm.

The outflow prevention valve may be arranged on the first coupling portion, wherein the hold-open element in the assembled state of the coupling portions is in abutment with an abutment face of the second coupling portion and retains the valve member of the outflow prevention valve in an open position counter to a closure force.

The anti-rotation safeguard may additionally have a securing element which is arranged between the first and the second coupling portion, wherein the securing element preferably has a non-rotationally symmetrical securing ring which forms a positive-locking connection with the first and the second coupling portions. As a result of this configuration, the anti-rotation safeguard can be produced in a simple and effective manner. Furthermore, the breakaway coupling may have a locking ring which engages in a first locking ring receiving member of the first coupling portion and a second locking ring receiving member of the second coupling portion and which can be disengaged from the locking ring receiving members by means of the defined separation force.

The coupling portions of the breakaway coupling can be constructed to connect at least one additional pair of fluid lines to each other, for example, the first and second fluid lines may be constructed to supply a first fluid and the additional pair of fluid lines may be constructed to return a second fluid. The coupling portions may to this end be able to be connected to the at least one additional pair of fluid lines, wherein the coupling portions have at least one additional outflow prevention valve which is associated with the additional pair of fluid lines and which has a valve seat and a sealing member which is constructed to cooperate with the valve seat, wherein the additional outflow prevention valve comprises a hold-open element which is constructed in the assembled state of the coupling portions to enable the fluid to flow through, wherein the additional outflow prevention valve is constructed, in the separated state of the coupling portions, to prevent an outflow of the fluid from at least one of the additional fluid lines. The additional outflow prevention valve may further in a manner according to the invention be constructed as described above. In addition, there may also be provision for outflow prevention valves which are constructed in each case according to the invention to be arranged on both coupling portions so that the outflow of the fluid from both fluid lines is prevented.

Figure 2:
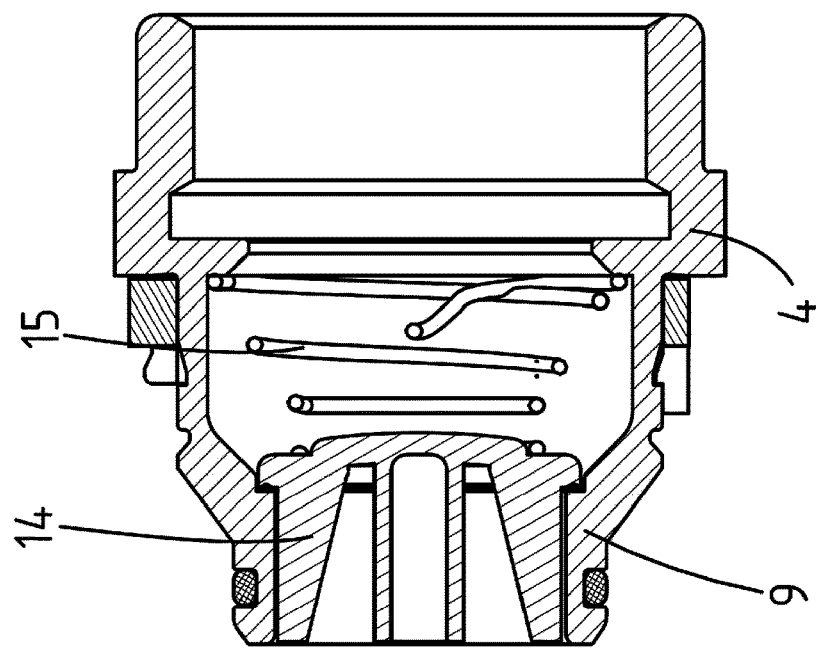
Figure 2:
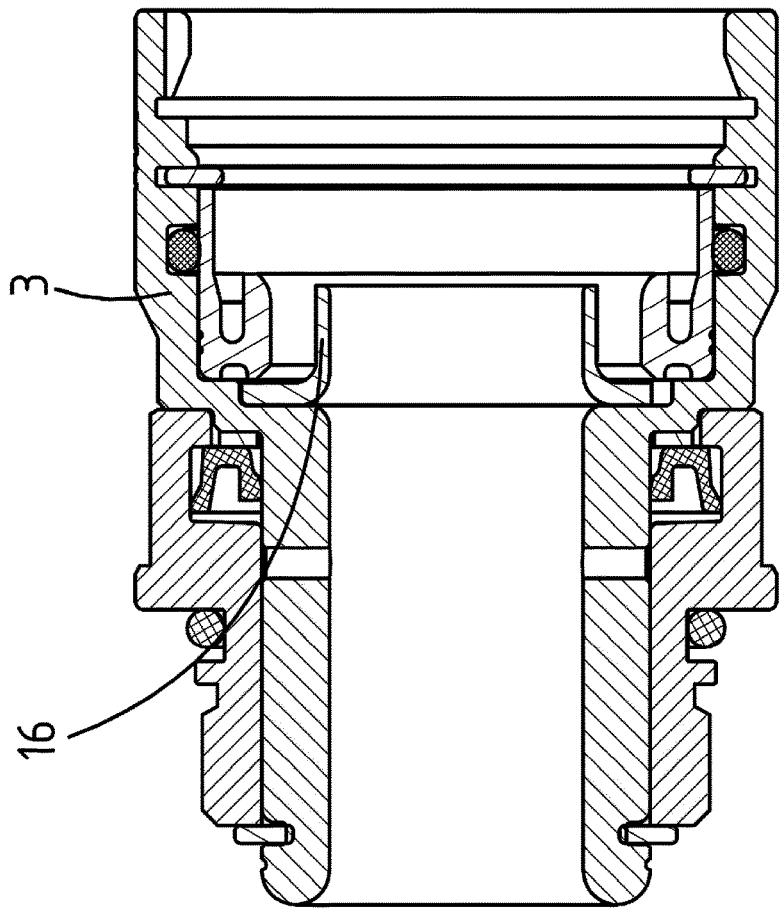
Figure 3:
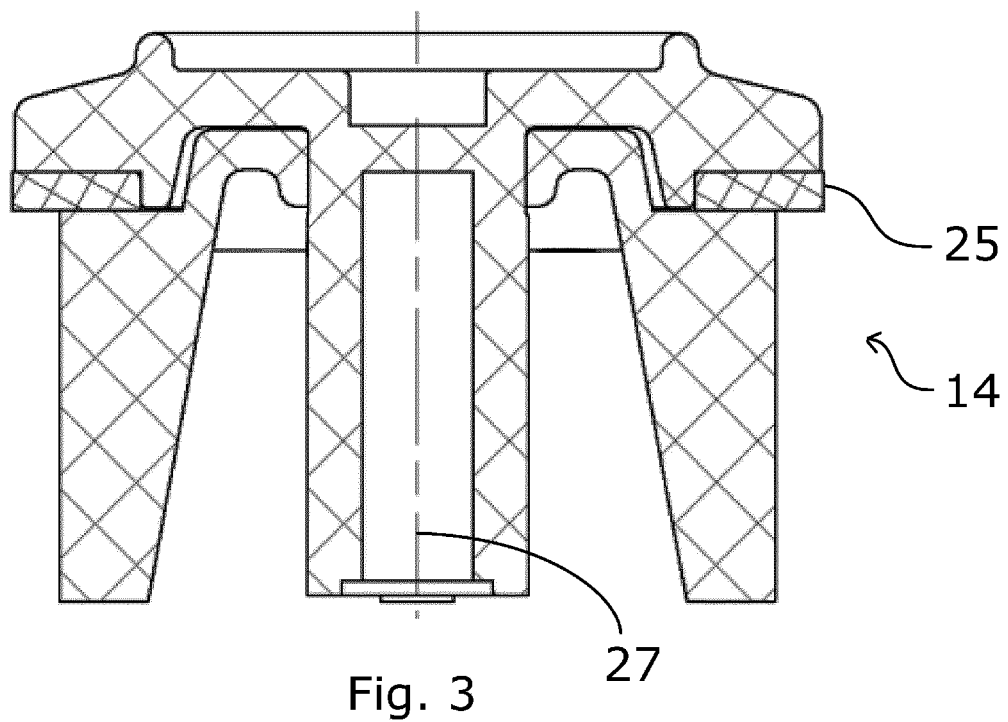

The invention is explained by way of example below with reference to preferred embodiments and the appended drawings, in which:

FIG. 1: is a longitudinal sectioned illustration of a first embodiment of a breakaway coupling according to the invention in the assembled state of the coupling portions;

FIG. 2: is a lateral longitudinal sectioned illustration of the embodiment of FIG. 1 after the coupling portions have been separated;

FIG. 3: is a lateral cross-sectional view of an alternative sealing member which can be used in another embodiment of a breakaway coupling according to the invention.

FIG. 1 is a longitudinal sectioned view of a breakaway coupling according to the invention. The breakaway coupling comprises a first coupling portion 3 and a second coupling portion 4. The coupling portions are located in FIG. 1 in an assembled state. The second coupling portion 4 which in this instance is constructed as a male coupling portion, engages in this state in the first coupling portion 3 which is constructed as a female coupling portion. The coupling portions 3, 4 each have a fluid connection 13 for connecting to a fluid line (not shown).

The two coupling portions 3, 4 are secured to each other using a locking ring 5 which engages in a locking ring receiving member which is arranged on an inner face of the first coupling portion 3 and in another locking ring receiving member which is arranged on an outer face of the second coupling portion 4.

Between the coupling portions 3, 4 there is arranged a non-rotationally symmetrical securing ring 12 which cooperates in a positive-locking manner with both coupling portions 3, 4 and which in this manner prevents a relative rotation of the two coupling portions 3, 4 with respect to each other.

The breakaway coupling further has an outflow prevention valve 20 which is arranged in an end region 9 of the second coupling portion 4. The outflow prevention valve 20 comprises a sealing member 14 and a valve seat 21. The sealing member 14 is connected to a restoring spring 15 which applies a closure force to the sealing member 14 and thus urges it in the direction of a closure position. In the assembled state of the coupling portions 3, 4 shown in FIG. 1, however, the sealing member 14 is retained in an open position by means of a hold-open element 16. A front face of the hold-open element 16 which faces toward the second coupling portion 4 presses in this state against a counter-face of the sealing member 14 and thus retains it in the open position counter to the closure force. In this position, the fluid can flow through a channel formed inside the coupling portions 3, 4.

The valve seat 21 has an abutment face 24 for a sealing face 26 of the sealing member 14. In the region of the abutment face 24 there is a compensation element 25 which is arranged concentrically relative to a longitudinal axis 22 of the valve seat and which is connected in a materially engaging manner to the abutment face 24 of the valve seat 21. The compensation element 25 is produced from acrylonitrile butadiene rubber (NBR) and has a hardness of 85 Shore-A. The valve seat 21 is produced from aluminum and the sealing member 14 and the sealing face 26 thereof are produced from plastics material. The valve seat 21 and sealing member 14 have a significantly greater hardness than the compensation element. The mean roughness depth R, in accordance with DIN EN ISO 4287:1984 of the material of the sealing member 14 is in this instance 4 µm. As a result of the compensation element 25, in the region of the abutment face 24 direct contact between the material of the sealing member 14 and the material of the valve seat 21 is prevented.

Furthermore, as a result of the inner wall face of the breakaway coupling downstream of the valve seat 21 there is formed for the sealing member 14 a guide along which the sealing member 14 can be moved. This guide enables an angular deviation of more than 0.1° between an axial direction of the sealing member 14 and the longitudinal axis 22 of the valve seat 21.

In conventional breakaway couplings without an anti-rotation safeguard (not shown), there is regularly produced rotation of the coupling portions 3, 4 relative to each other. In this instance, the sealing member 16 which is in abutment with the hold-open element 16 is generally moved, which leads to an optimal orientation of the sealing member relative to the sealing seat. Since in this instance, however, an anti-rotation safeguard is used, over time, as a result of environmental effects such as, for example, as a result of impacts or non-symmetrical wear, a misalignment of the sealing member 14 relative to the sealing seat 21 may occur. This misalignment is illustrated in an exaggerated manner in FIG. 1 for the purposes of illustration.

When a significant separation force acts on one of the coupling portions, the locking ring 5 disengages from the locking ring receiving member of the first and/or second coupling portion and thus enables a controlled and defined separation of both coupling portions 3, 4 from each other.

In FIG. 2, the embodiment of FIG. 1 is shown in a separated state of the coupling portions. Immediately during the separation event, the front face of the hold-open element 16 is moved away from the counter-face of the sealing member 14 so that the sealing member 14 is moved by the closure force applied by the restoring spring 15 into the closure position. A sealing face 26 of the sealing member 14 thereby comes to rest on the compensation element 15 and the fluid channel of the second coupling portion 4 is thereby closed.

The above-described misalignment of the sealing member 14 relative to the longitudinal axis 22 may, however, lead to the sealing face 26 not resting in an optimum manner on the valve seat 21. As a result of the misalignment of the sealing member 14, a peripheral portion of the sealing face 26 protrudes further forward in the longitudinal direction than an opposing peripheral portion in the peripheral direction. The peripheral portion which protrudes further in the longitudinal direction consequently meets the abutment face 24 first. As a result of the compensation element 25 which is arranged at that location, however, the soft material of the compensation element at this location can become deformed so that the misalignment is compensated for and in spite of the misalignment a sealing closure is produced between the sealing face 26 of the sealing member 14 and the abutment face 24 of the valve seat 21.

FIG. 3 is a lateral sectioned view of a sealing member 14 in an alternative embodiment of a breakaway coupling according to the invention. In this alternative embodiment, the compensation element 25 is not arranged on the valve seat 21, but instead, as shown in FIG. 3, on the sealing member 14. To this end, the sealing member has a groove which extends in the peripheral direction and in which the compensation element is inserted. Furthermore, in FIG. 3 the axial direction 27 of the sealing member 14 is illustrated. Otherwise, the alternative embodiment is identical to the embodiment of FIGS. 1 and 2.

The invention claimed is:

1. A breakaway coupling for connecting two fluid lines, comprising a first coupling portion (3) which can be connected to a first fluid line of the two fluid lines and a second coupling portion (4) which can be connected to a second fluid line of the two fluid lines, having the following features:
  a. the coupling portions (3, 4) can be separated from each other by means of a defined separation force;
  b. at least one of the coupling portions (3, 4) has an outflow prevention valve (20) having a valve seat (21) and a sealing member (14) which is constructed to cooperate with the valve seat (21),
  c. the outflow prevention valve (20) has a hold-open element (16) which is constructed in the assembled state of the coupling portions (3, 4) to enable the fluid to flow through,
  d. the outflow prevention valve (20) is constructed in the separated state of the coupling portions (3, 4) to prevent an outflow of the fluid from at least one of the two fluid lines,
  e. the outflow prevention valve has a guide which has play for the sealing member (14) and which is constructed in the closure position to allow an angular deviation of at least 0.2° between an axial direction of the valve seat (21) and an axial direction of the sealing member (14),
  f. the breakaway coupling further has an anti-rotation safeguard which during operation of the coupling prevents rotation of the first coupling portion (3) and second coupling portion (4) relative to each other, wherein the anti-rotation safeguard has a securing element (12) which is arranged between the first coupling portion (3) and the second coupling portion (4), characterized by the additional features:
  g. the valve seat (21) has an abutment face (24) for the sealing member (14),
  h. in the region of the abutment face (24) there is arranged a compensation element (25) which comprises a material which has a lower hardness than the material of the valve seat (21) and/or than the material of the sealing member (14), wherein the compensation element is arranged between the valve seat (21) and the sealing member (14) in such a manner that it prevents, in the region of the abutment face (24), direct contact between the valve seat (21) and the sealing member (14).

2. The breakaway coupling as claimed in claim 1, wherein the compensation element (25) is connected to the sealing member (14), wherein the connection is carried out in a frictionally engaging or positive-locking or materially engaging manner.

3. The breakaway coupling as claimed in claim 2, wherein the sealing member (14) has a groove which extends in a peripheral direction and in which the compensation element (25) is inserted.

4. The breakaway coupling as claimed in claim 3, wherein the sealing member (14) is constructed in a resilient manner so that a clamping action is applied to the compensation element (25) which is inserted into the groove.

5. The breakaway coupling as claimed in claim 1, wherein the compensation element (25) is connected to the valve seat (21), wherein the connection is carried out in a frictionally engaging or positive-locking or materially engaging manner.

6. The breakaway coupling as claimed in claim 5, wherein the valve seat (21) has a groove which extends in a peripheral direction and in which the compensation element (25) is inserted.

7. The breakaway coupling as claimed in claim 6, wherein the valve seat (21) is constructed in a resilient manner so that a clamping action is applied to the compensation element (25) which is inserted into the groove.

8. The breakaway coupling as claimed in claim 1, wherein the compensation element (25) comprises a material whose hardness is in the range between 25 and 100 Shore-A.

9. The breakaway coupling as claimed in claim 8, wherein the hardness is in the range between 75 and 90 Shore-A.

10. The breakaway coupling as claimed in claim 1, wherein the compensation element (25) has a plastics material, in particular an elastomer material, or is formed therefrom.

11. The breakaway coupling as claimed in claim 1, wherein the sealing member (14) and/or the valve seat (21) has/have a plastics material or a metal or is formed therefrom.

12. The breakaway coupling as claimed in claim 1, wherein the sealing member (14) and/or the valve seat (21) has/have in the region of the abutment face (24) a mean roughness depth Rz which is between 1 μm and 63 μm.

13. The breakaway coupling as claimed in claim 12, wherein the mean roughness depth Rz is between 4 μm and 10 μm.

14. The breakaway coupling as claimed in claim 1, wherein the outflow prevention valve (20) is arranged on the second coupling portion (4), wherein the hold-open element

(16) in the assembled state of the coupling portions (3, 4) is in abutment with an abutment face of the first coupling portion (3) and holds the valve member (14) of the outflow prevention valve (20) in an open position counter to a closure force.

15. The breakaway coupling as claimed in claim 1, wherein the securing element (12) has a non-rotationally symmetrical securing ring which forms a positive-locking connection with the first coupling portion (3) and second coupling portion (4).

16. The breakaway coupling as claimed in claim 1, which has a locking ring (5) which engages in a first locking ring receiving member of the first coupling portion (3) and a second locking ring receiving member of the second coupling portion (4) and which can be disengaged by means of a defined separation force.

17. The breakaway coupling as claimed in claim 1, wherein the sealing member (14) and the valve seat (21) are configured to assume a misaligned position with regard to each other, and wherein the compensation element (25) is configured to compensate the misalignment between the sealing member (14) and the valve seat (21) by a local more powerful deformation.

18. The breakaway coupling as claimed in claim 1, wherein the guide is in an end region (9) of at least one of the coupling portions (3, 4).

19. A breakaway coupling for connecting two fluid lines, comprising a first coupling portion (3) which can be connected to a first fluid line of the two fluid lines and a second coupling portion (4) which can be connected to a second fluid line of the two fluid lines, having the following features:
   a. the coupling portions (3, 4) can be separated from each other by means of a defined separation force;
   b. at least one of the coupling portions (3, 4) has an outflow prevention valve (20) having a valve seat (21) and a sealing member (14) which is constructed to cooperate with the valve seat (21),
   c. the outflow prevention valve (20) has a hold-open element (16) which is constructed in the assembled state of the coupling portions (3, 4) to enable the fluid to flow through,
   d. the outflow prevention valve (20) is constructed in the separated state of the coupling portions (3, 4) to prevent an outflow of the fluid from at least one of the two fluid lines,
   e. the breakaway coupling further has an anti-rotation safeguard which during operation of the coupling prevents rotation of the first coupling portion (3) and second coupling portion (4) relative to each other, wherein the anti-rotation safeguard has a securing element (12) which is arranged between the first coupling portion (3) and the second coupling portion (4), characterized by the additional features:
   f. the valve seat (21) has an abutment face (24) for the sealing member (14),
   g. in the region of the abutment face (24) there is arranged a compensation element (25) which comprises a material which has a lower hardness than the material of the valve seat (21) and/or than the material of the sealing member (14).

20. The breakaway coupling as claimed in claim 19, wherein the sealing member (14) and the valve seat (21) are configured to assume a misaligned position with regard to each other, wherein the compensation element (25) is preferably configured to compensate the misalignment between the sealing member (14) and the valve seat (21) by a local more powerful deformation.

21. The breakaway coupling as claimed in claim 19, wherein the material of the compensation element (25) has a lower hardness than the material of the valve seat (21) and than the material of the sealing member (14).

22. The breakaway coupling as claimed in claim 19, wherein the securing element (12) is positioned radially between the first coupling portion (3) and the second coupling portion (4).

\* \* \* \* \*